(12) United States Patent
Jeon et al.

(10) Patent No.: US 10,599,257 B2
(45) Date of Patent: Mar. 24, 2020

(54) TOUCH SCREEN DEVICE HAVING IMPROVED FLOATING MODE ENTRY CONDITIONS

(71) Applicant: STMicroelectronics Asia Pacific Pte Ltd, Singapore (SG)

(72) Inventors: Aiden Jeon, Seoul (KP); Kai Lim, Incheon (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/033,730

(22) Filed: Jul. 12, 2018

(65) Prior Publication Data

US 2020/0019269 A1    Jan. 16, 2020

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ............................... G06F 3/0416; G06F 3/044
See application file for complete search history.

(56) References Cited

U.S. PATENT DOCUMENTS

| 2011/0157069 | A1* | 6/2011 | Zhuang | G06F 3/044 345/174 |
| 2015/0077394 | A1* | 3/2015 | Dai | G06F 3/0416 345/174 |
| 2016/0313825 | A1* | 10/2016 | Hotelling | G06F 3/044 |

* cited by examiner

*Primary Examiner* — Chun-Nan Lin
(74) *Attorney, Agent, or Firm* — Crowe & Dunlevy

(57) ABSTRACT

Disclosed herein is a touch screen controller including input circuitry operating a touch screen, and processing circuitry cooperating with the input circuitry to acquire mutual touch data and self touch data from the touch screen, sum values of the mutual touch data to produce mutual sums, normalize the mutual sums and the self touch data, and calculate differences between the normalized self touch data and the normalized mutual sums. The touch screen controller enters into a floating mode if a largest difference that is positive is greater than a positive difference threshold and if a smallest difference value that is negative is less than a negative difference threshold, but enters a non-floating mode if the largest difference that is positive is less than the positive difference threshold or if the smallest difference value that is negative is less than the negative difference threshold.

13 Claims, 12 Drawing Sheets

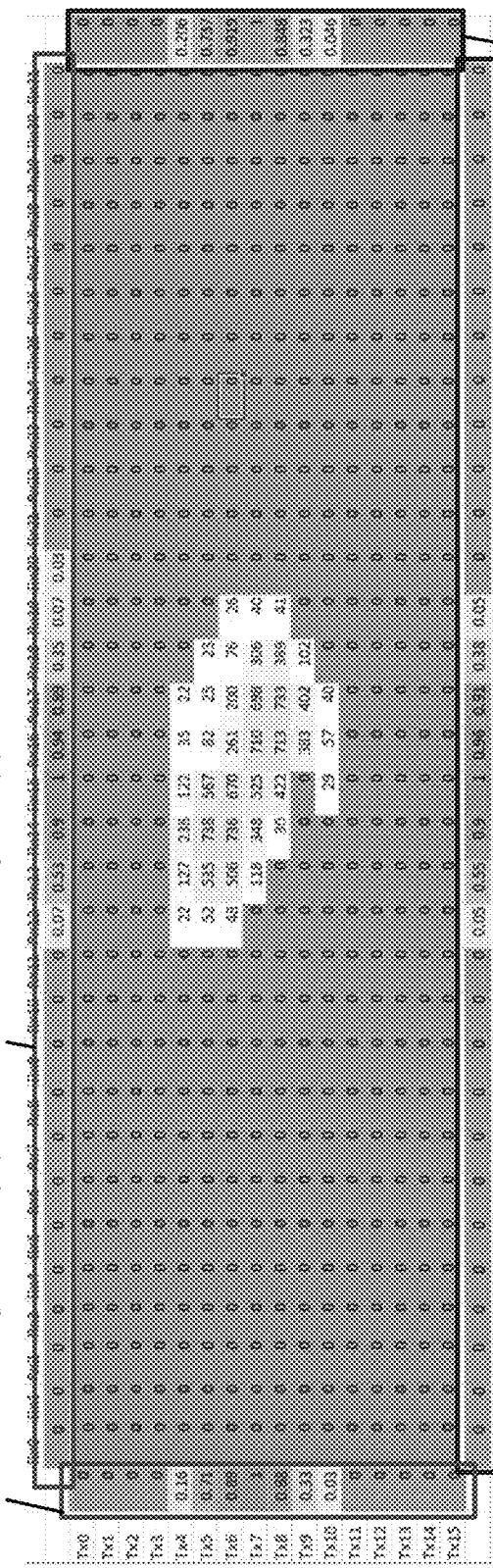
FIG. 8G
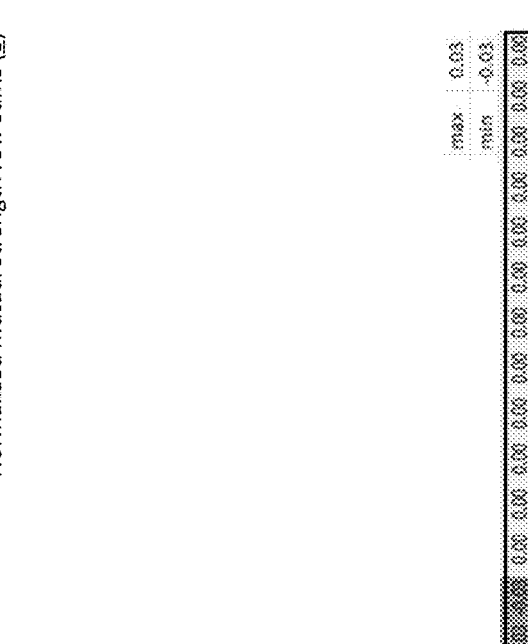
FIG. 8H
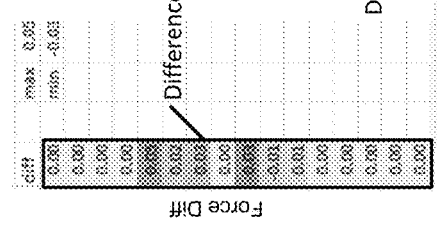

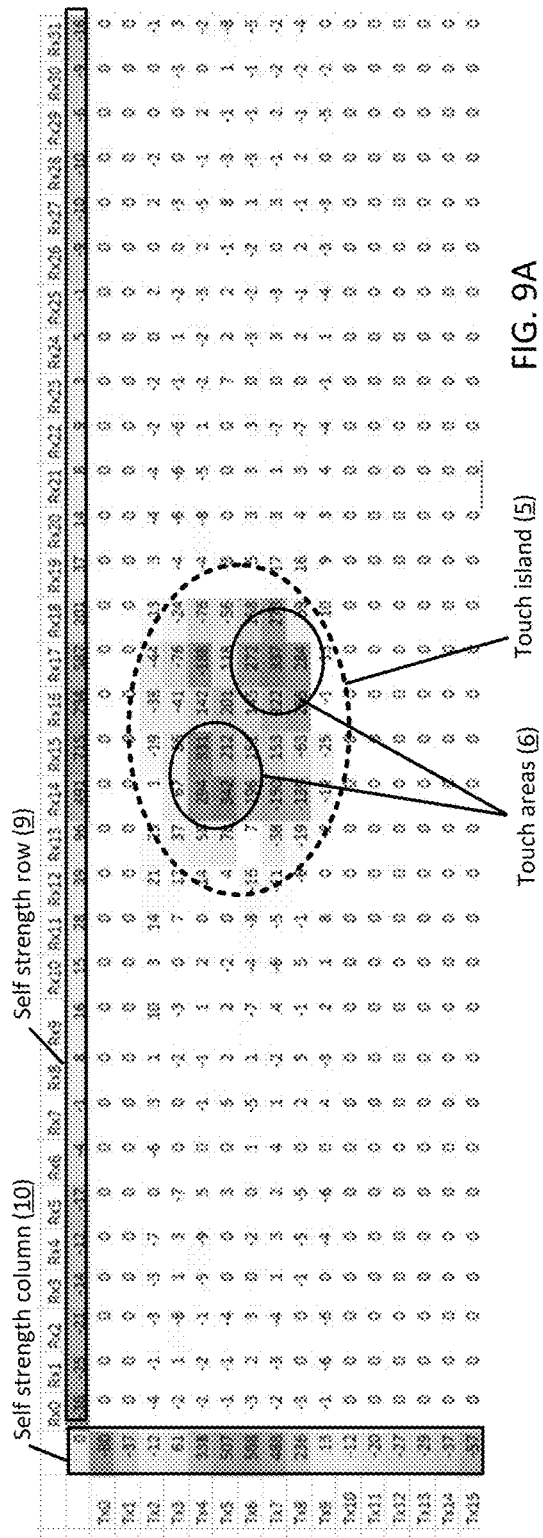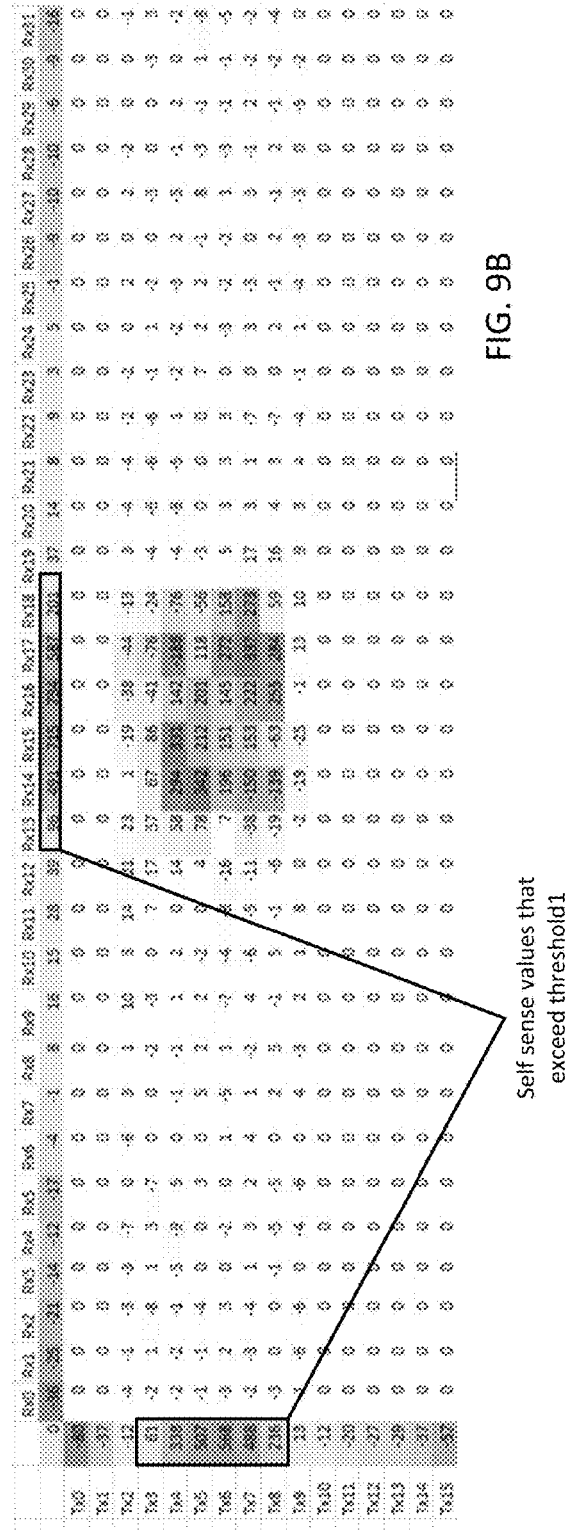

TOUCH SCREEN DEVICE HAVING IMPROVED FLOATING MODE ENTRY CONDITIONS

TECHNICAL FIELD

The present disclosure relates to the field of electronic devices and, more particularly, to touch screen devices capable of switching between a normal touch sensing mode and a floating touch sensing mode. The floating touch sensing mode is used in the case where the ground levels of the touch screen device and the finger of a user touching the touch screen of the touch screen device are different, and disclosed herein is a technique for accurately determining when to enter the floating touch sensing mode.

BACKGROUND

Touch screens are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. The conductive features form capacitive nodes at various points. By evaluating changes in capacitance at each capacitive node, a user touch or hover, such as by a finger or, can be detected. Such a touch results in a touch data island when the patterned array of conductive features is read. A touch data island is a group of interconnected nodes with strength values having a magnitude above a certain threshold.

It is common for conventional touch sensing techniques to support detection of multiple touches. Finger separation algorithms are commonly applied to each touch data island so as to determine the presence of multiple simultaneous touches. Conventional finger separation algorithms are more effective under normal touch sensing modes than under conventional floating touch sensing modes.

Shown in FIG. 1A is a first operating condition in which the user is holding the touch screen device in their hand while touching the touch screen with their finger. The ground level of the touch screen device and the finger are the same, and the capacitances between the touch screen device and ground (shown as Cphone) and between the finger and ground (shown as Cfinger) are the same. In this condition, conventional finger separation algorithms are effective.

Shown in FIG. 1B is a second operating condition in which the touch screen device is plugged into a power cord to receive power from electrical mains while the user is touching the touch screen with their finger, but is not holding the touch screen device. The ground level of the touch screen device and the finger are the same, and the capacitances between the touch screen device and ground (shown as Cphone) and between the finger and ground (shown as Cfinger) are the same. In this condition, conventional finger separation algorithms are effective.

Shown in FIG. 1C is a third operating condition in which the user is not holding the touch screen device in their hand (and the touch screen device is resting on a non-conductive surface) but the user is touching the touch screen with their finger. Here, the ground level of the touch screen device and the finger are not the same, and the capacitances between the touch screen device and ground (shown as Cphone) and between the finger and ground (shown as Cfinger) are not the same. In this third operating condition, which can be referred to as a floating condition, conventional finger separation algorithms may not be effective, and may falsely report multiple touches in a touch island when there was actually only a single touch The touch screen device in FIG. 2 is operating in the third operating condition, and it can be seen that the user is touching the touch screen. This touch screen device is executing a conventional finger separation algorithm which is incorrectly interpreting the touch by one large finger (a thumb) to be two touches C1 and C2.

A chart showing touch data values from the group of interconnected nodes (e.g., touch sensors) of the touch screen during the touch of FIG. 2, in the third operating condition, is shown in FIG. 3. Here, it can be seen that in the touch island 1 there are three circled touch areas 2 with large negative touch data (e.g., strength) values, which will result in unreliable interpretation of the touch. Here, multiple touches will be registered from the touch island, yet only one touch should be registered as only one finger is touching the touch screen.

Therefore, new operating techniques are needed so that the touch screen device can properly differentiate single touches from multiple touches in the floating condition.

SUMMARY

Disclosed herein is a touch screen controller operable with a touch screen. The touch screen controller includes input circuitry configured to operate the touch screen, and processing circuitry. The processing circuitry cooperates with the input circuitry to acquire mutual touch data from the touch screen, sum values of the mutual touch data to produce mutual sums, acquire self touch data from the touch screen, normalize the mutual sums and the self touch data, and calculate differences between the normalized self touch data and the normalized mutual sums. The processing circuitry then enters into a floating mode of touch data processing if a largest difference that is positive is greater than a positive difference threshold and if a smallest difference value that is negative is less than a negative difference threshold, but enters into a non-floating mode of touch data processing if the largest difference that is positive is less than the positive difference threshold or if the smallest difference value that is negative is less than the negative difference threshold.

The processing circuitry does not enter into the floating mode of touch data processing if a determined touch movement speed is less than a touch movement threshold.

The processing circuitry is configured to discard values of the self touch data that are less than a first threshold, prior to normalization. In addition, the processing circuitry is configured to discard values of the mutual touch data that are outside of an area defined by the self touch data remaining after discarding of the values less than the first threshold, and to discard remaining values of the mutual touch data that are less than a second threshold, prior to summing.

The processing circuitry is also configured to sum values of the mutual touch data that are negative, prior to discarding the remaining values of the mutual touch data that are less than the second threshold. The processing circuitry is configured to enter into the floating mode of touch data processing if the largest difference that is positive is greater than the positive difference threshold and if the smallest difference value that is negative is less than the negative difference threshold and if an absolute value of the summed values of the mutual touch data that are negative is greater than a third threshold, but enter a non-floating mode of touch data processing if the largest difference that is positive is less than the positive difference threshold or if the smallest difference value that is negative is less than the negative difference threshold or if the absolute value of the summed values of the mutual touch data that are negative is less than the third threshold.

Note that this summary is not intended to limit the scope of this disclosure in any way.

BRIEF DESCRIPTION OF THE DRAWINGS

FIG. 8C is a chart showing the discarding of the self capacitance touch data of FIG. 8B less than the first threshold, and the use of the remaining self capacitance touch data to identify a bitmap area in the mutual capacitance touch data.

FIG. 8D is a chart showing the discarding of mutual capacitance touch data of FIG. 8C outside of the bitmap area.

FIG. 8E is a chart showing the discarding of mutual capacitance touch data of FIG. 8D inside the bitmap area that is less than a second threshold.

FIG. 8F is a chart showing the calculation of mutual capacitance touch data row sums and mutual capacitance touch data column sums after discarding of the mutual capacitance touch data inside the bitmap area of FIG. 8E that is less than the second threshold.

FIG. 8G is a chart showing the normalization of the self capacitance touch data and the mutual capacitance touch data row and column sums of FIG. 8F.

FIG. 8H is a chart showing the calculation of differences between the normalized self capacitance touch data and the normalized mutual capacitance touch data row and column sums of FIG. 8G.

FIG. 9A is a chart showing touch data acquired from the touch screen device of FIG. 4 in which the touch screen device is operating in normal touch sensing mode, and the identification of a touch island and touch areas.

FIG. 9B is a chart showing the identification of the self capacitance touch data of FIG. 9A greater than a first threshold.

FIG. 9C is a chart showing the discarding of the self capacitance touch data of FIG. 9B less than the first threshold, and the use of the remaining self capacitance touch data to identify a bitmap area in the mutual capacitance touch data.

FIG. 9D is a chart showing the discarding of mutual capacitance touch data of FIG. 9C outside of the bitmap area.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 4:
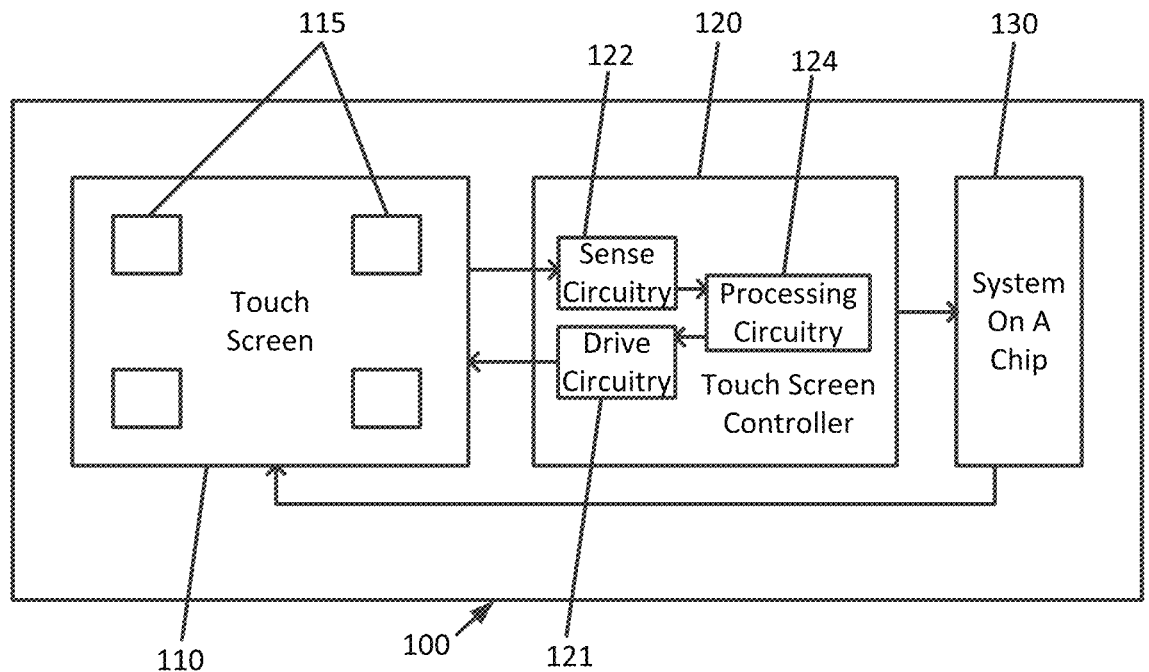
FIG. 4 is a block diagram of a touch screen device on which the techniques described herein may be performed.

FIG. 4 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch screen display 110, coupled to a touch screen controller 120. The touch screen display 110 is designed to receive touch inputs from a user through a user's fingers or a stylus.

Figure 5:
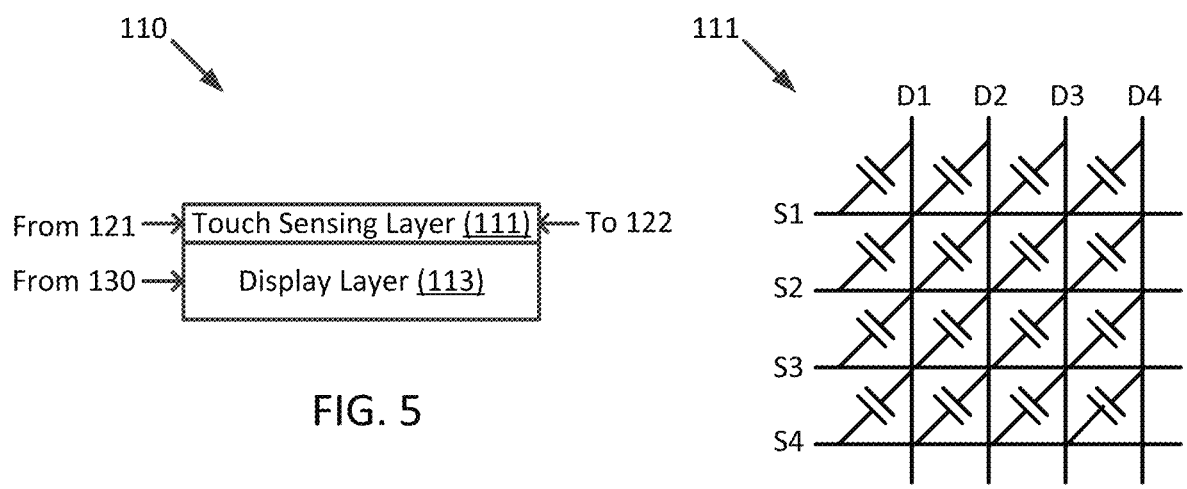
FIG. 5 is a block diagram of the touch screen of the touch screen device of FIG. 4.

The touch screen display 110 includes a display layer 113 and a touch sensing layer 111 (shown in FIG. 5). The touch sensing layer 111 is comprised of touch screen sensors 115 that are configured to detect touches (or other input actions such as hover or gesture motions) to the touch screen display 110. As a touch is sensed, the touch screen controller 120 may receive touch signals from the sensors 115 via sense circuitry 122 and analyze the touch signal(s) using processing circuitry 124. This analysis produces coordinates of the received touch. These coordinates may then be used by a system on a chip (SOC) 130 to manipulate operations with respect to applications and programs executing on the touch screen device 100.

It is noted that the same sensors 115 are capable of being used for both self-capacitance sensing and mutual capacitance sensing, and that therefore both the sense circuitry 122 and the processing circuitry 124 are likewise capable of operating in both self-capacitance sensing and mutual sensing modes.

Figure 6:
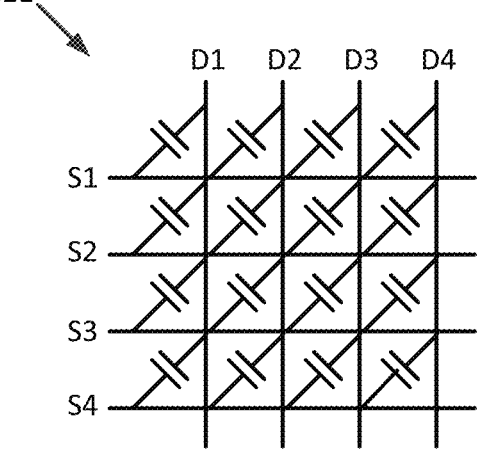
FIG. 6 is the capacitive touch matrix of the touch screen of FIG. 5.

As shown in FIG. 6, patterned orthogonal lines, namely conductive rows (sense lines S1-S4) and columns (drive lines D1-D4), are formed in the touch sensing layer 111. The intersections of the columns and rows form the individual capacitive touch sensors 115, and the processing circuitry 124 scans these touch sensors and processes the generated signals to identify the location and type of a touch point or points. Thus, the touch screen display 110 may be considered as producing a touch map having XY coordinates wherein several touch regions (as defined by a set of XY coordinates) of possible touch information may be generated based on one or more touches to the touch screen display 110. The coordinates generated above are XY coordinates identifying the location of the touch on the touch screen display 110.

In the mutual capacitance sensing mode, a drive signal is applied to the drive lines D1-D4 by drive circuitry 121, and capacitance values are measured at the sense lines S1-S4 by the sense circuitry 122. Since bringing a finger or conductive stylus near the surface of the sensor changes the local electric field, this causes a reduction in the mutual capacitance between the drive lines and the sense lines, and the capacitance change at every individual point on the grid can be measured to accurately determine the touch location. Therefore, the output of mutual capacitance sensing is a two-dimensional matrix of values, with one value for each intersection between conductive lines. Thus, it can be appreciated that mutual capacitance sensing allows multi-touch operation where multiple fingers, palms or styli can be accurately tracked at the same time.

In the self capacitance sensing mode, the drive signal is applied to both sense lines S1-S4 and drive lines D1-D4, and capacitance values are measured at each of the sense lines S1-S4 and drive lines D1-D4. Bringing a finger or conductive stylus near the surface of the sensor changes the local electric field, increasing the self capacitance (capacitance between the drive line or sense line of interest and ground) in this instance. This results in a stronger sensed signal than with mutual capacitance sensing. However, since all lines S1-S4 and D1-D4 are driven, the capacitance change can only be measured on each conductive line. Therefore, the output of self capacitance sensing is two one dimensional arrays of values (e.g., a singular column and a singular row of values), with one value for each individual sense line S1-D4 and drive line D1-D4. Therefore, it can be appreciated that self capacitance sensing allows for more precise touch measurements, but can only resolve touches by a single finger accurately, and multiple touches may result in ghosting or misplaced location sensing.

Figure 1A:
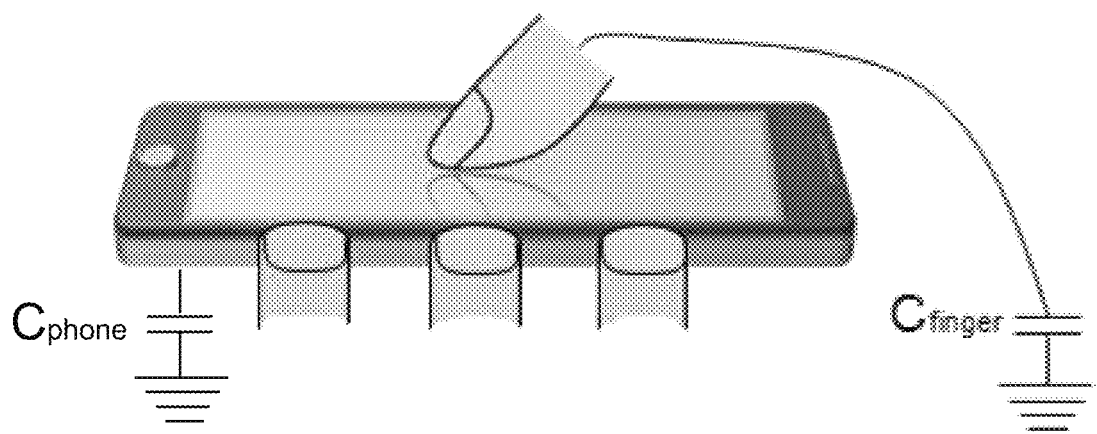
FIG. 1A is a diagram showing a user touching the touch screen of a touch screen device while holding the touch screen device, resulting in a first operating condition.
Figure 1B:
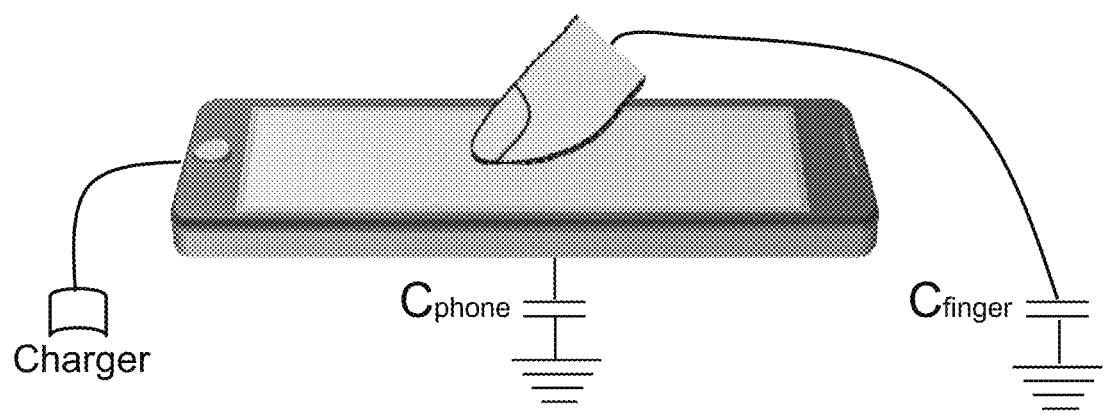
FIG. 1B is a diagram showing a user touching the touch screen of a touch screen device while the touch screen device is plugged into a power cord receiving power from electrical mains, resulting in a second operating condition.
Figure 1C:
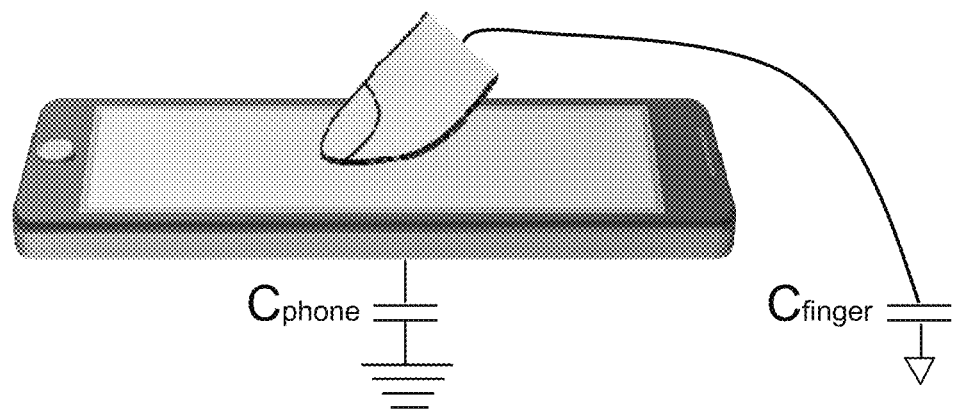
FIG. 1C is a diagram showing a user touching the touch screen of a touch screen device but not holding the touch screen device, resulting in a third operating condition.
Figure 2:
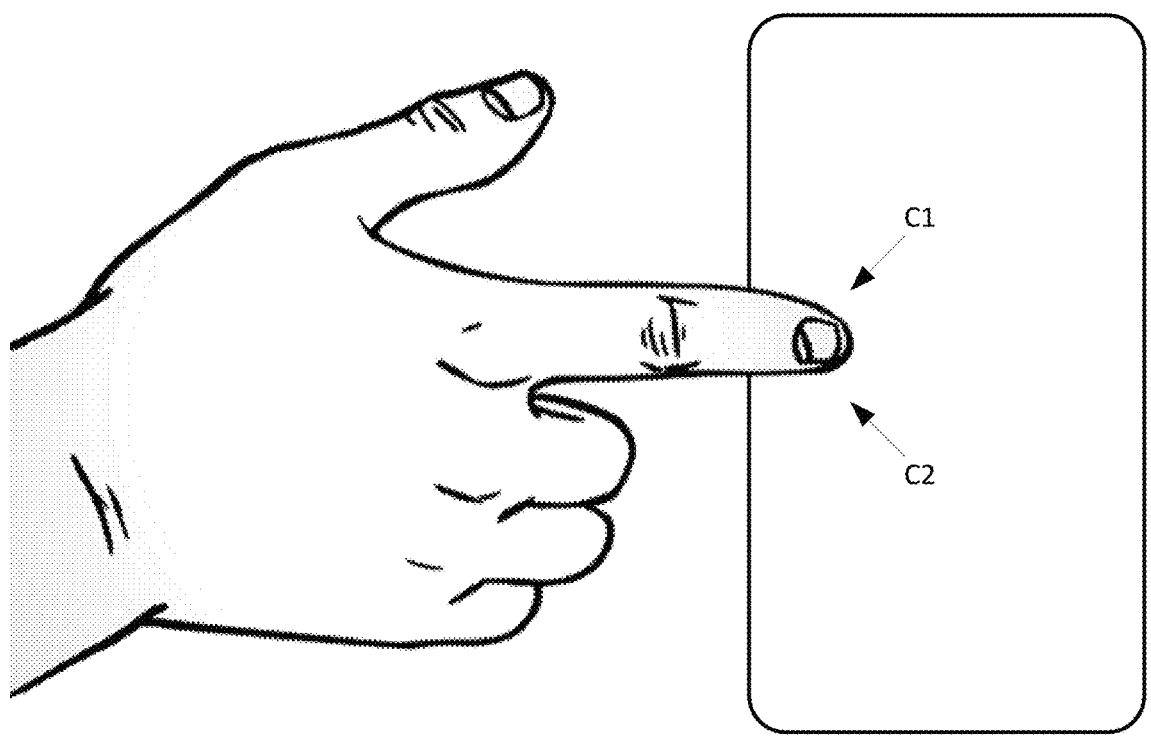
FIG. 2 is a diagram depicting a user touching the touch screen of a touch screen device but not holding the touch screen device, resulting in a third operating condition in which a finger separation algorithm has incorrectly reported two separate touches instead of a single touch.
Figure 3:
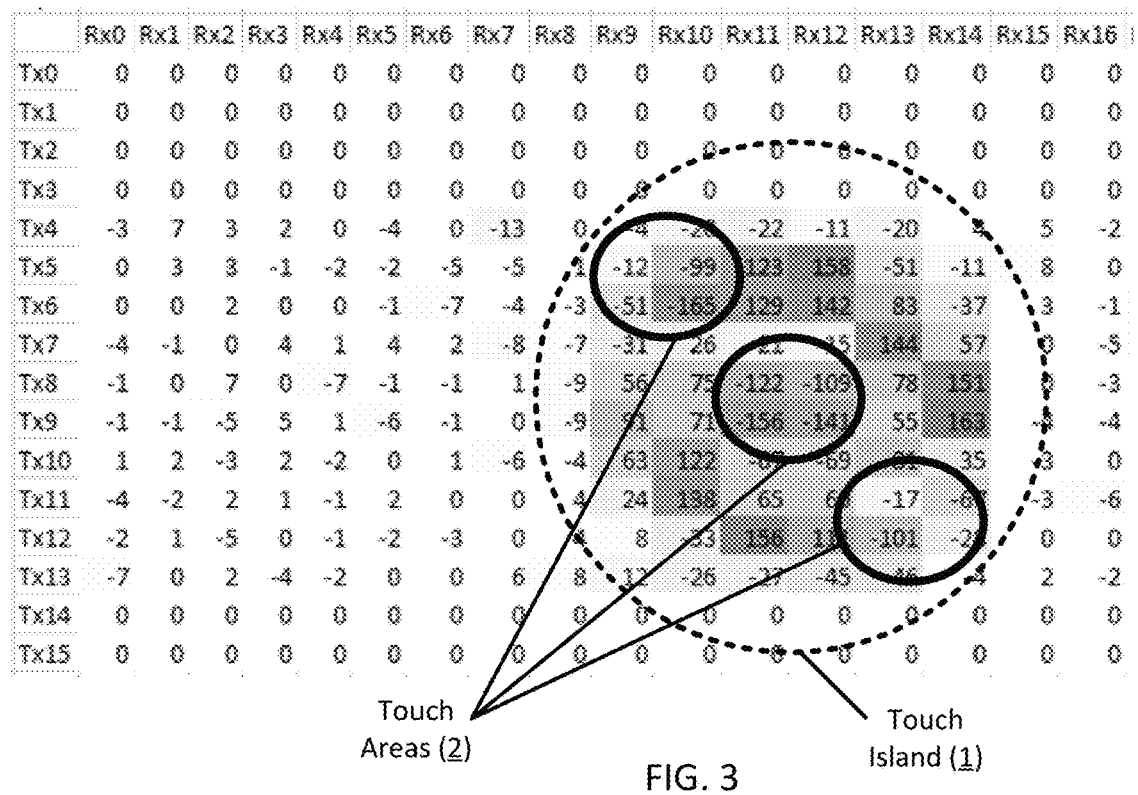
FIG. 3 is a chart showing touch data values acquired from the touch screen of the touch screen device of FIG. 2 during the touch depicted in FIG. 2 while the touch screen device is in the third operating condition.

As explained above, there are three typical operating conditions that a touch screen device 100 can be in, with regard to the ground of the touch screen device 100 versus the ground of the user's hand or finger. These can be grouped into non-floating conditions (where the ground of the user's hand or finger is the approximately the same as the touch screen device 100) and floating conditions (where the ground of the user's hand or finger is different than that of the touch screen device 100). Touch sensing and processing is performed differently when the touch screen device 100 is in a floating condition as opposed to a non-floating condition, with touch sensing and processing being referred to as "floating mode" when the touch screen device 100 is in a floating condition, and with touch sensing and processing being referred to as "normal mode" when the touch screen device 100 is in a non-floating condition. In floating mode, when multiple touches in a single touch island are recognized (such as touch areas 2 in touch island 1 of FIG. 3), they are merged to be recognized as a single touch, while in normal mode they would not be merged.

Note that in floating mode as opposed to normal node, touch coordinates are generated by merging all touch areas in the bitmap area. In addition, the weight of filtering applied for preventing the shaking of the coordinate is large.

It is therefore of commercial interest to be able to correctly determine when the touch screen device 100 is in a floating condition so that it can be switched into floating mode, and so that it is not improperly switched into floating mode when it is not in a floating condition. Attempted prior techniques thus far have not adequately addressed this commercial desire. Therefore, the new techniques described herein have been developed. It has been found that when the touch screen device 100 is in a non-floating condition, the differences between mutual and self touch strength values are minimal, but when the touch screen device 100 is in a floating condition, notable differences between mutual and self touch strength values are present. The techniques described herein exploit this to produce an accurate determination of whether the touch screen device 100 is in a floating condition or a non-floating condition.

Figure 7:
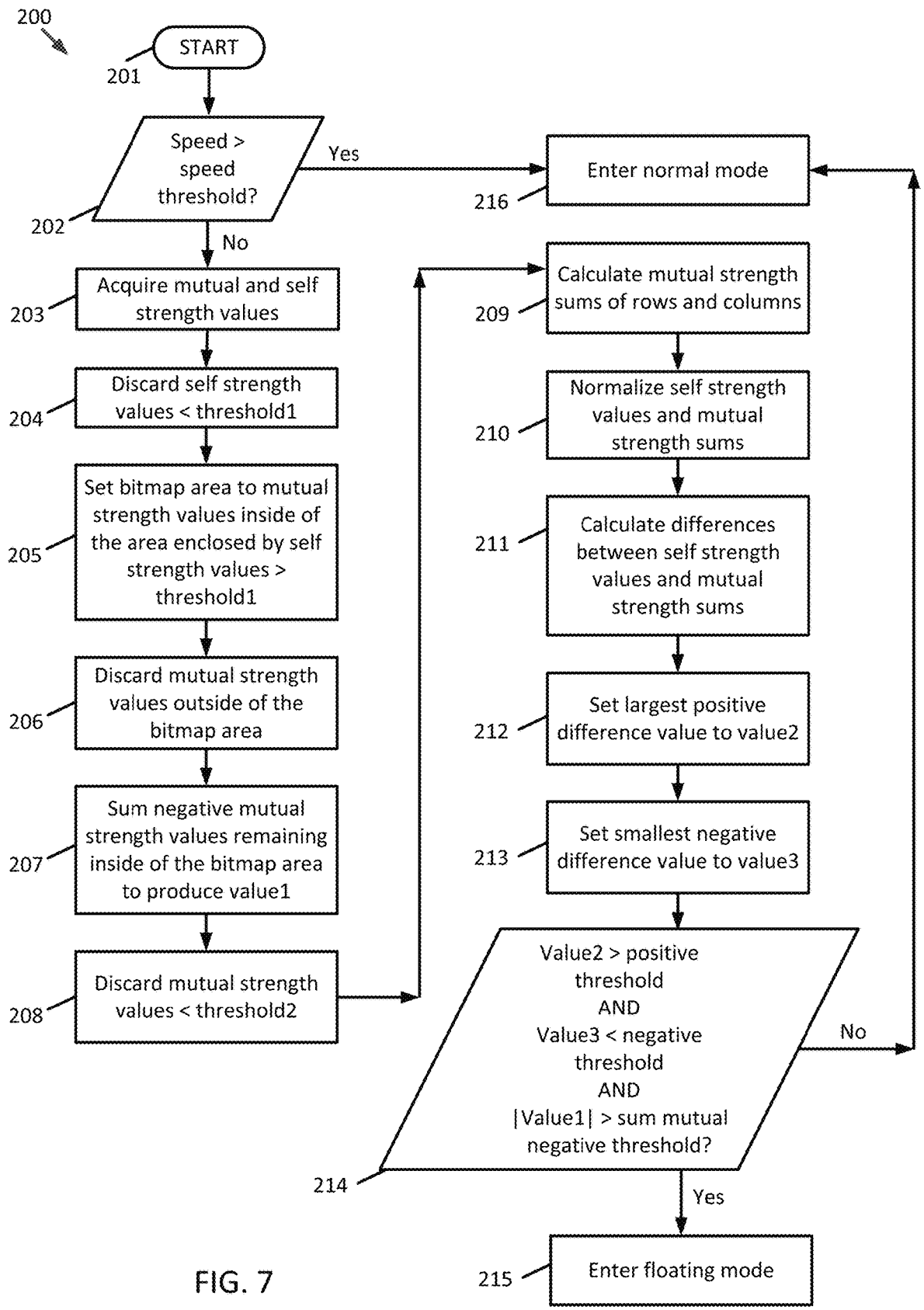
FIG. 7 is a flowchart of a technique for determining when to enter and exit floating mode detection.

Now described with reference to flowchart 200 of FIG. 7 is a technique for determining whether the touch screen device 100 is in a floating condition. After the start (Block 201), the speed of movement of the user's finger across the touch screen 110 is determined and compared to a speed threshold (Block 202). This is performed by comparing the coordinate of the touch from the previous frame of data to the coordinate of the touch from the frame of data before that one. If the result is greater than a set speed threshold, then the touch screen device 100 remains in normal mode or switches into normal mode (Block 216).

Figure 8A:
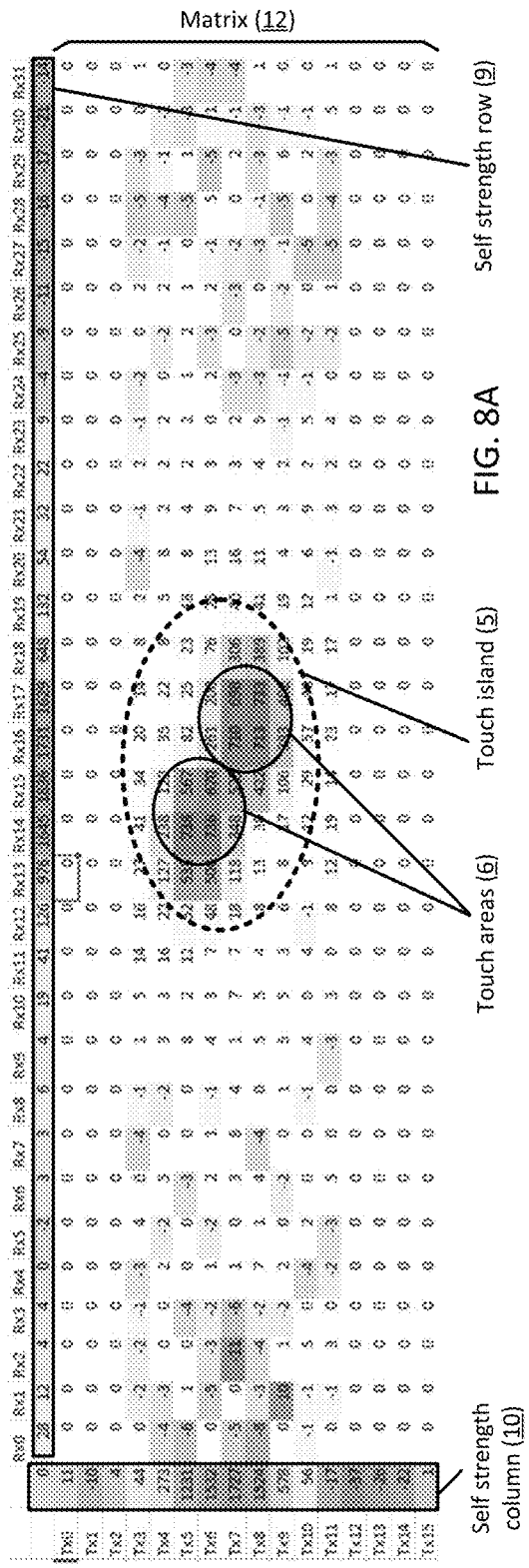
FIG. 8A is a chart showing touch data acquired from the touch screen device of FIG. 4 in which the touch screen device is operating in normal touch sensing mode, and the identification of a touch island and touch areas.

If the result is less than the set speed threshold (and in this example, assume that the result is less than the set speed threshold), then the touch screen device 100 acquires of matrix a mutual touch data in a mutual touch sensing mode and acquires two one-dimensional arrays of self touch data in a self touch sensing mode (Block 203). As can be seen in FIG. 8A, the matrix 12 is divided into columns Rx0-Rx31 and rows Tx0-Tx15 of mutual touch strength values (also referred to as mutual sense values), and there is a column 10 of self strength values (also referred to as self sense values) and a row 9 of self strength values (also referred to as self sense values). The touch island 5 encompasses two touch areas 6. Note that each column Rx0-Rx31 has one self strength value, but 15 mutual strength values. Likewise, note that each row Tx0-Tx15 has one self strength value, but 31 mutual strength values.

A touch island 5 is identified, and inside the touch island 5 are two touch areas 6. Determining whether the touch areas 6 represent two separate touches (for example, a multi-touch) or whether they represent a single touch can be performed using a finger separation technique. However, it is desired to know whether the touch screen device 100 is in floating mode or normal mode prior to using any finger separation technique.

Figure 8B:
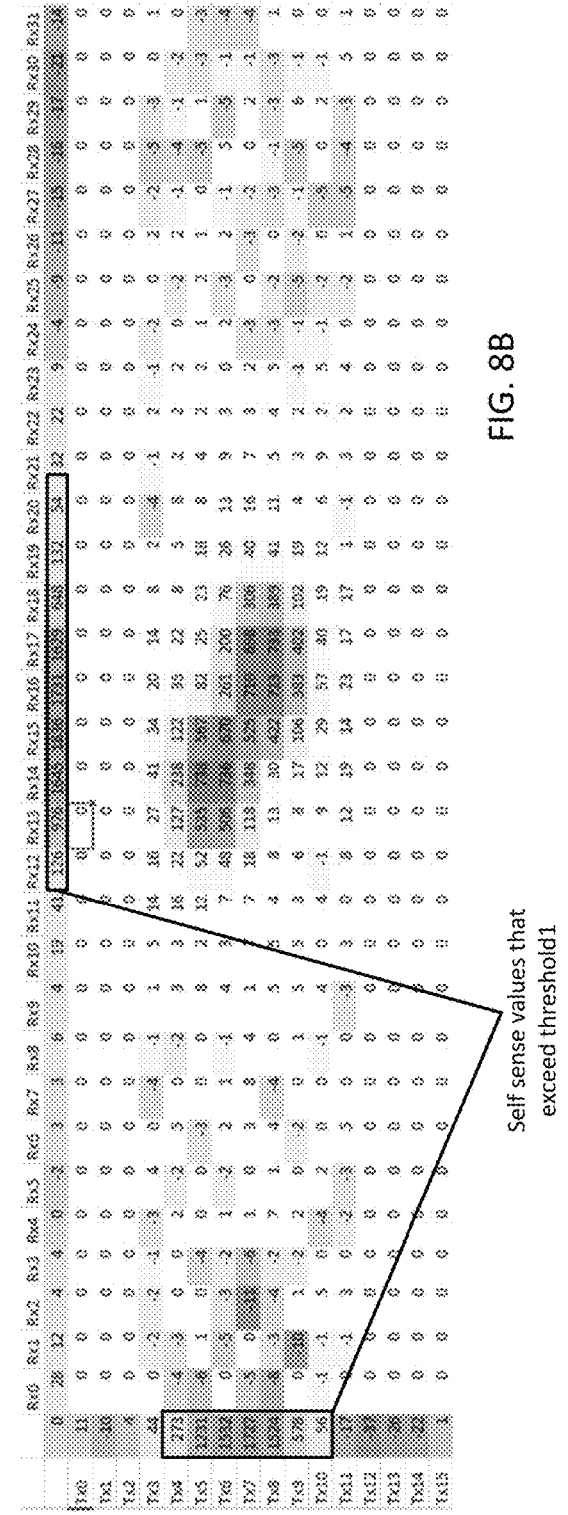
FIG. 8B is a chart showing the identification of the self capacitance touch data of FIG. 8A greater than a first threshold.

Self sense values of the row and column less than a self sense threshold value (first threshold value) are then identified (Block 204). In the example of FIG. 8B, the first threshold value is set to 50. Therefore, the self strength values for Tx4-Tx10 and Rx12-Rx20 are greater than the first threshold. The self strength values less than the first threshold value, which here are at Tx0-Tx3 and Tx11-Tx15, and Rx0-Rx11 and Rx21-Rx31 are discarded (also Block 204), with the results being shown in FIG. 8C. Then, a bitmap area 11 is defined in the matrix 12 by the area enclosed by the remaining self sense values (Block 205). Stated another way, the bitmap area 11 includes those values in the matrix 12 representing mutual strength values acquired at intersections of Tx4-Tx10 and Rx12-Rx20.

Figures 8C, 8D:
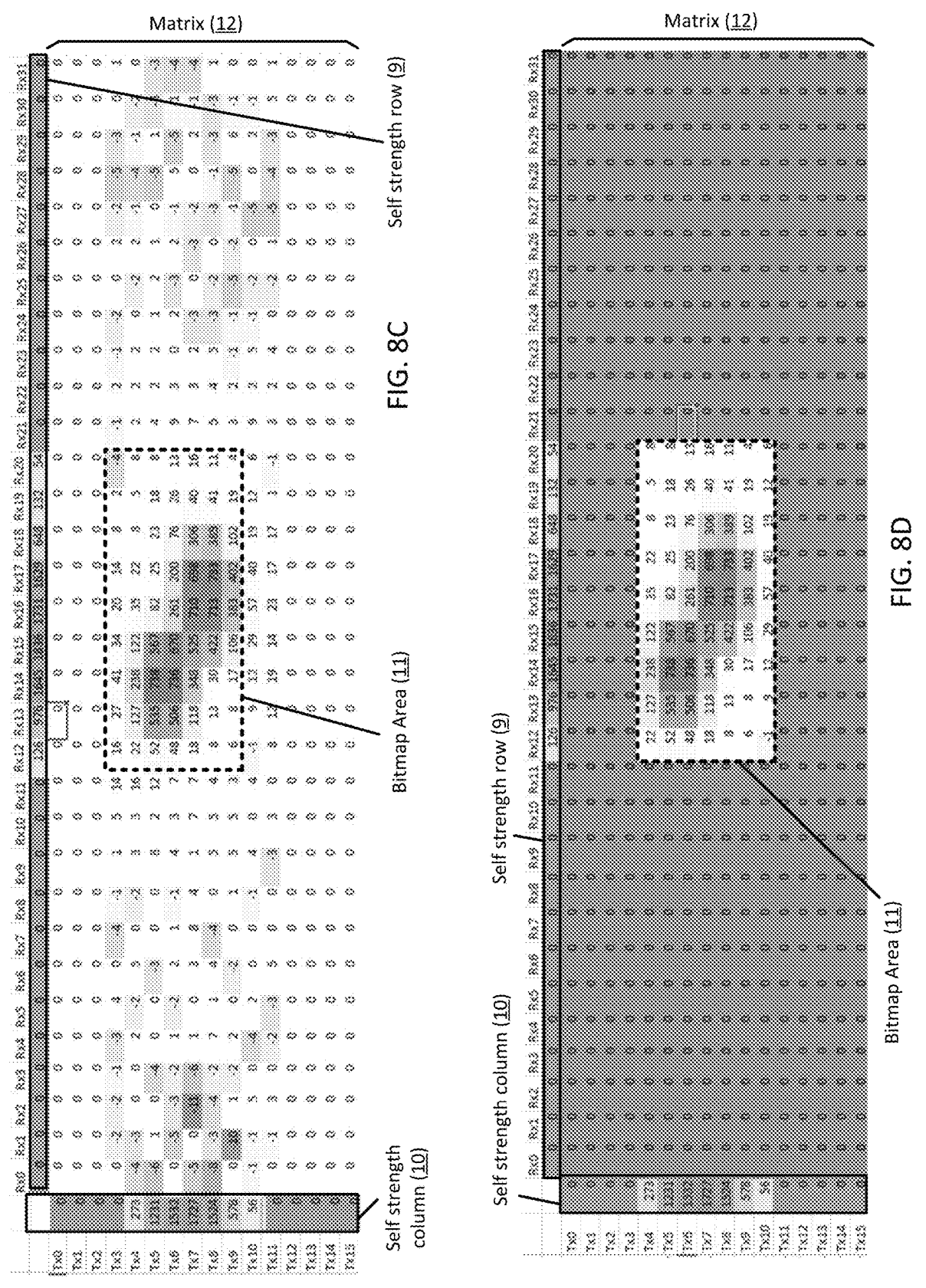

Then, mutual sense values of the matrix outside of that bitmap area 11 are discarded (Block 206), with the result being shown in FIG. 8D. Note, therefore, that the mutual sense values discarded at this step are those which are not at intersections of lines Tx4-Tx10 and Rx12-Rx20, and that those boundaries were set by the self strength values, not the mutual strength values themselves. Thus, the remaining mutual sense values inside the bitmap area 11 may at this point still be of any value, and may be positive or negative.

Figures 8E, 8F:
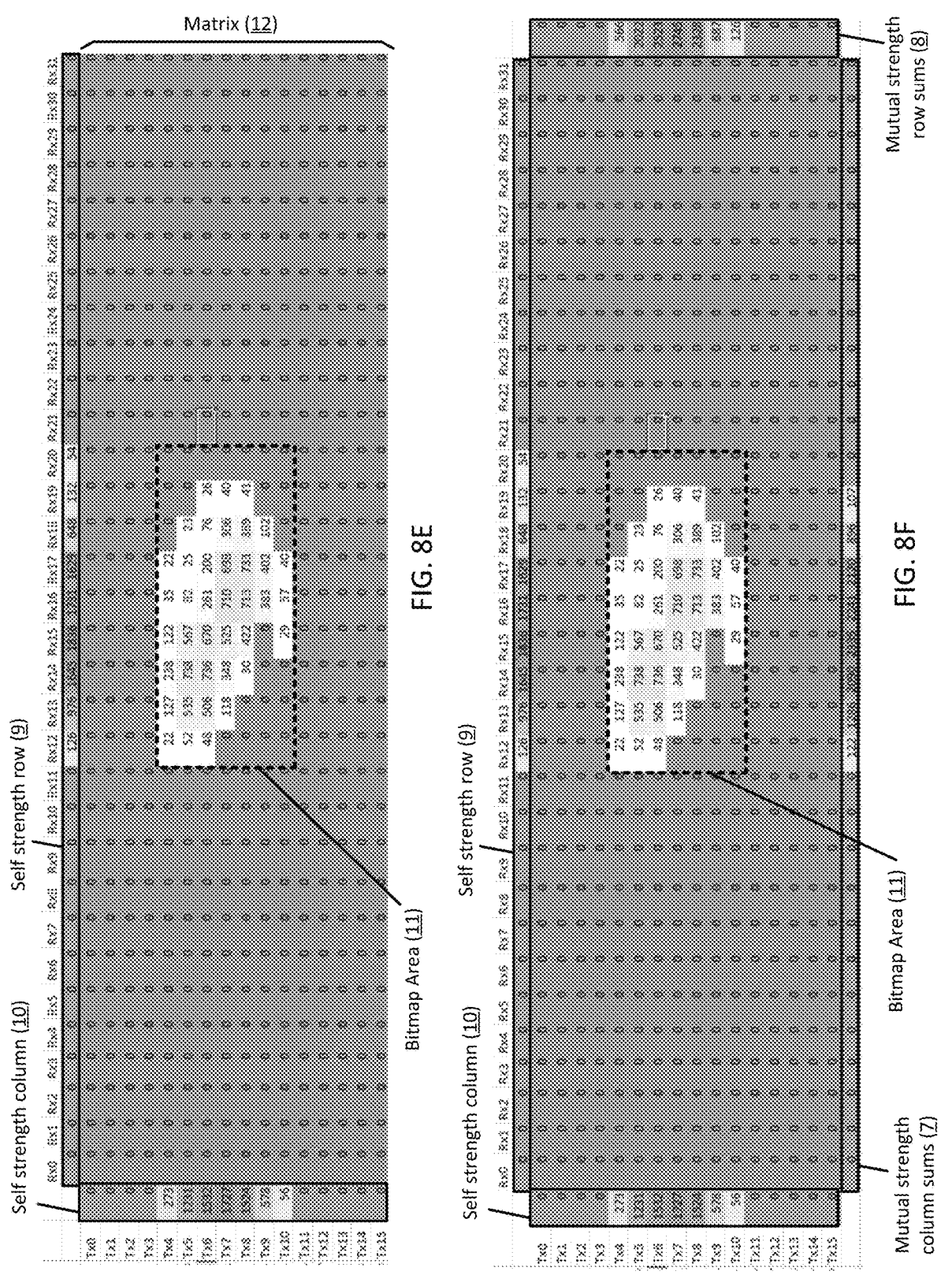

Remaining mutual sense values in the bitmap area 11 that are negative are then summed to produce a negative sum (value1) at Block 207. Note that in the example of FIG. 8D, there is only one negative mutual sense value (−1) in the bitmap area 11, so value1 will be −1. Thereafter, mutual remaining mutual strength values inside the bitmap area 11 that are less than a mutual sense threshold value (second threshold value) are discarded (Block 208). In this example, the second threshold value is set to 20. The results of this operation are shown in FIG. 8E, where it can be seen that all values inside the bitmap area 11 that are less than 20 have been discarded. This discards any remaining negative values as well.

Remaining values of each row and column of the matrix are then summed to produce mutual sense column sums 7 and mutual sense row sums 8 (Block 209), with the results being shown in FIG. 8F. Then, the mutual sense column sums and mutual sense row sums, as well as the self sense column and self sense row, are normalized (Block 210), with the results being shown in FIG. 8G. This normalization is performed by dividing the mutual sense column sums 7, mutual sense row sums 8, self strength row values 9, and self strength column values 10 by the respective maximum mutual and self column and row strengths. It can be seen that this normalization produces values that are a maximum of 1.

The maximum mutual row and column strengths are the largest that occur during touch data collection, and the maximum self row and column strengths are the largest that occur touch during data collection.

Then, at Block 211, the normalized mutual sense column sums 7 of FIG. 8G are subtracted from the self strength row values 9 of FIG. 8G to produce a difference row 14 as shown in FIG. 8H. Likewise, the normalized mutual sense row sums 8 of FIG. 8G are subtracted from the self strength column values 10 of FIG. 8G to produce a difference column 13 as shown in FIG. 8H.

A largest positive difference value is located and saved (value2) at Block 212, and a smallest negative difference value is located and saved (value3) at Block 213. In the example of FIG. 8H, it can be seen that the value2 will be 0.05, and the value3 will be −0.03.

Now, at Block 214, entry conditions to the floating mode are evaluated. If the largest positive difference value (value2) is greater than a positive threshold, and if the smallest negative difference value (value3) is less than a negative threshold, and if an absolute value of the negative sum (value1) is greater than a sum mutual negative threshold, then floating mode is entered at Block 215. Otherwise, normal mode is entered at Block 216.

Here, the positive threshold is set at 0.18 and the negative threshold is set at −0.05. Since 0.05 (value2) is not greater than 0.18 (positive threshold), since −0.03 is not less than −0.05, and since |−1| is not greater than 30 (sum mutual negative threshold), floating mode is not entered in the example of 8A-8H.

Now referring back to flowchart 200 of FIG. 7 is an example where the touch screen device 100 is in a floating condition. After the start (Block 201), the speed of movement of the user's finger across the touch screen 110 is determined and compared to a speed threshold (Block 202). Since it is assumed for sake of this example that the speed of movement is less than the movement threshold, the touch screen device 100 acquires of matrix a mutual touch data in mutual touch sensing mode and acquires two one-dimensional arrays of self touch data in self touch sensing mode (Block 203). As can be seen in FIG. 9A, the matrix 12 is divided into columns Rx0-Rx31 and rows Tx0-Tx15 of mutual touch strength values, and there is a column 10 of self strength values and a row 9 of self strength values. The touch island 5 encompasses two touch areas 6.

A touch island 5 is identified, and inside the touch island 5 are two touch areas 6. Determining whether the touch areas 6 represent two separate touches (for example, a multi-touch) or whether they represent a single touch can be performed using a finger separation technique. However, it is desired to know whether the touch screen device 100 is in floating mode or normal mode prior to using any finger separation technique. This of particular concern in this example given that there are many negative values in the touch island 5, which is often indicative of being in floating mode. Therefore, the technique of this disclosure continues.

Figures 9C, 9D:
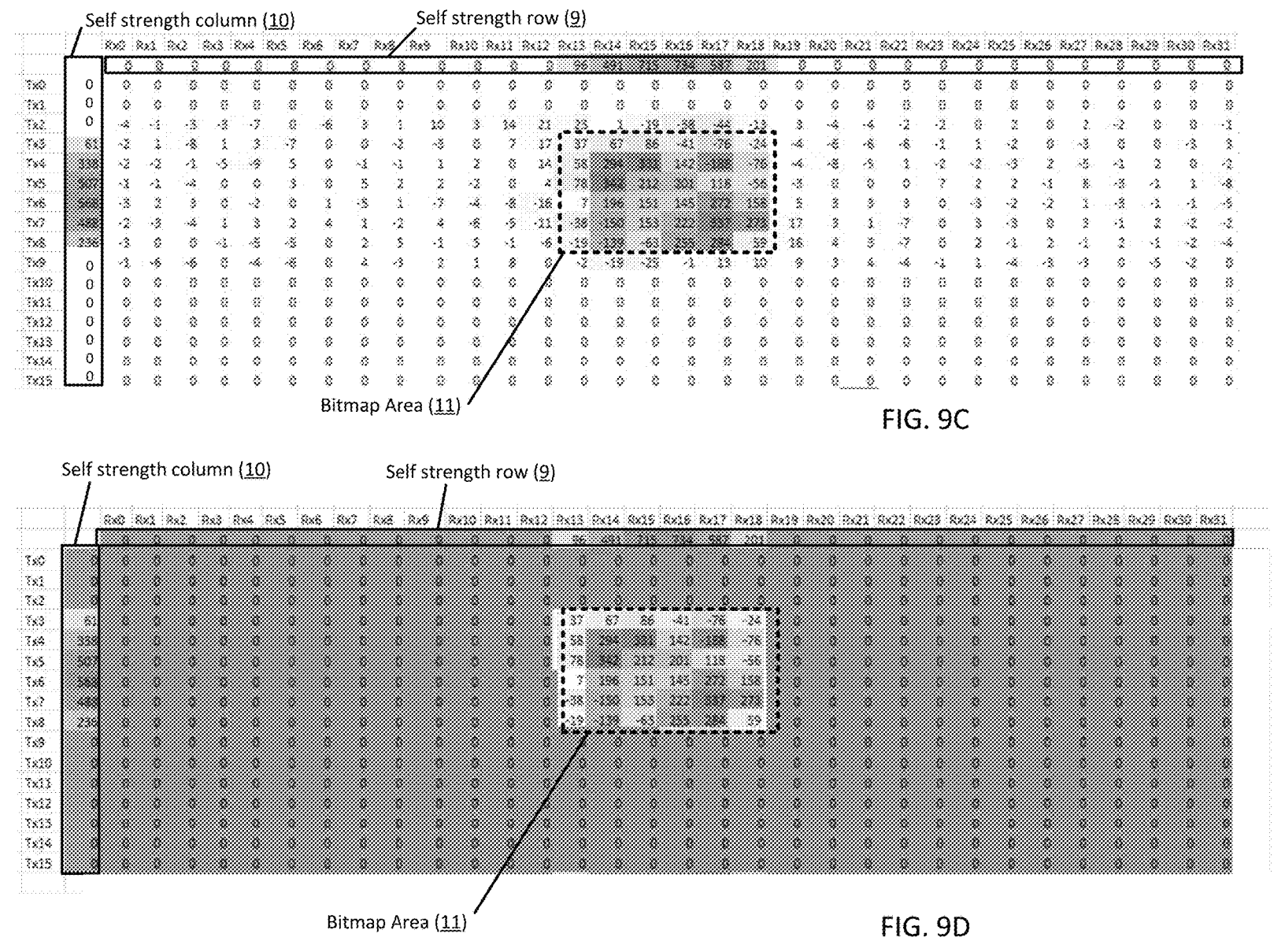

Self sense values of the row and column less than a self sense threshold value (first threshold value) are identified (Block 204). In the example of FIG. 9B, the first threshold value is set to 50, therefore, the self strength values for Tx3-Tx8 and Rx13-Rx18 are greater than the first threshold. The self strength values less than the first threshold value, which here are Tx0-Tx2 and Tx9-Tx15, and Rx0-Rx12 and Rx19-Rx31 are discarded (also Block 204), with the results being shown in FIG. 9C. Then, a bitmap area 11 is defined in the matrix 12 by the area enclosed by the remaining self sense values (Block 205). Stated another way, the bitmap area 11 includes those values in the matrix 12 representing mutual strength values acquired at intersections of Tx3-Tx8 and Rx13-Rx18.

Figure 9E:
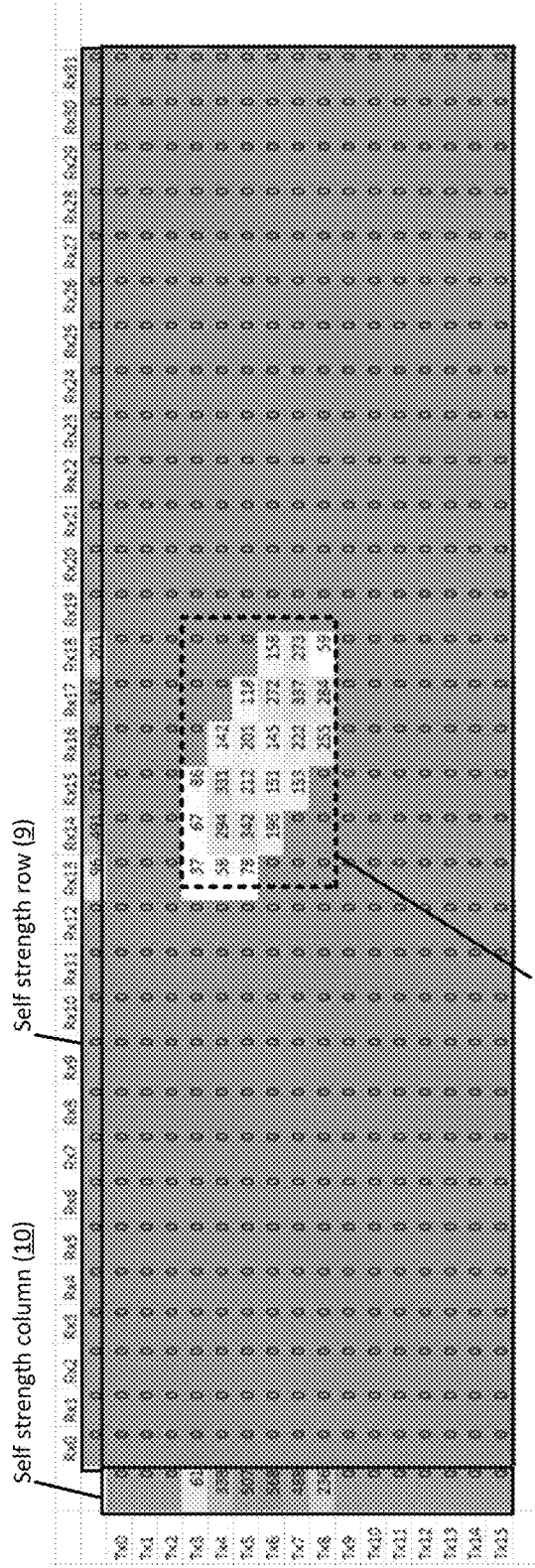
FIG. 9E is a chart showing the discarding of mutual capacitance touch data of FIG. 9D inside the bitmap area that is less than a second threshold.

Then, mutual sense values of the matrix outside of that bitmap area 11 are discarded (Block 206), with the result being shown in FIG. 9D. Remaining mutual sense values in the bitmap area 11 that are negative are then summed to produce a negative sum (value1) at Block 207. In the example of FIG. 9D, this sum will be −870. Thereafter, mutual remaining mutual strength values inside the bitmap area 11 that are less than a mutual sense threshold value (second threshold value) are discarded (Block 208). In this example, the second threshold value is set to 20. The results of this operation are shown in FIG. 9E, where it can be seen that all values inside the bitmap area 11 that are less than 20 have been discarded.

Figure 9F:
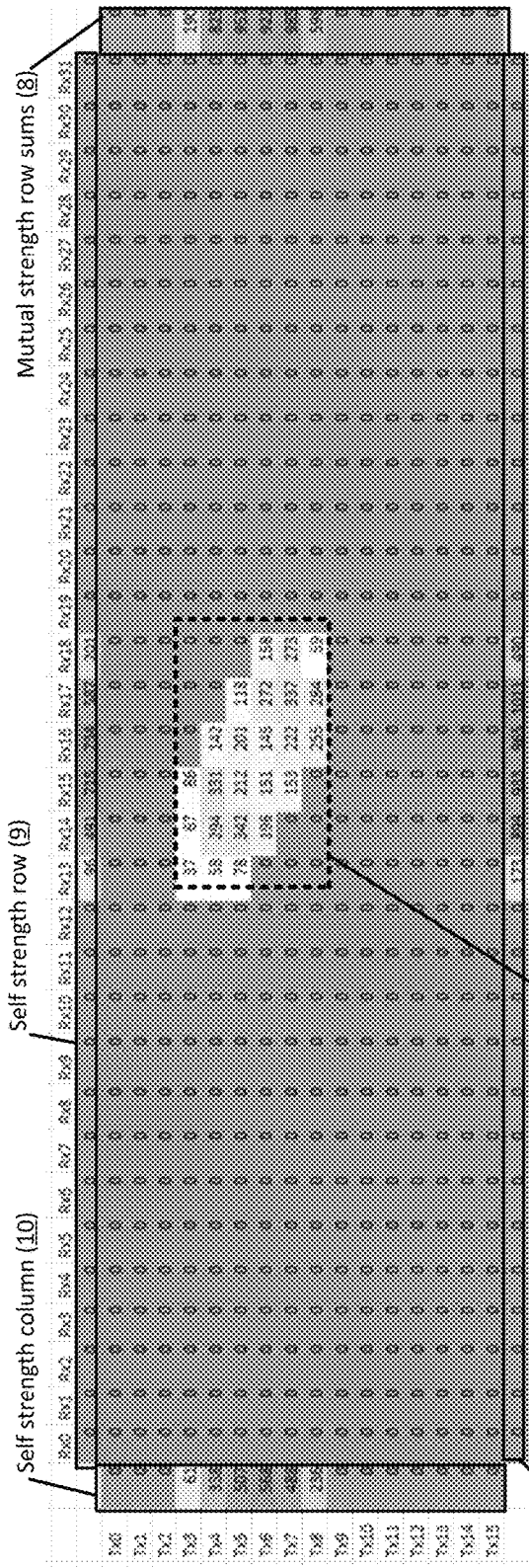
FIG. 9F is a chart showing the calculation of mutual capacitance touch data row sums and mutual capacitance touch data column sums after discarding of the mutual capacitance touch data inside the bitmap area of FIG. 9E that is less than the second threshold.

Remaining values of each row and column of the matrix are then summed to produce mutual sense column sums 7 and mutual sense row sums 8 (Block 209), with the results being shown in FIG. 9F. Then, the mutual sense column sums and mutual sense row sums, as well as the self sense column and self sense row, are normalized (Block 210), with the results being shown in FIG. 9G.

Figure 9G:
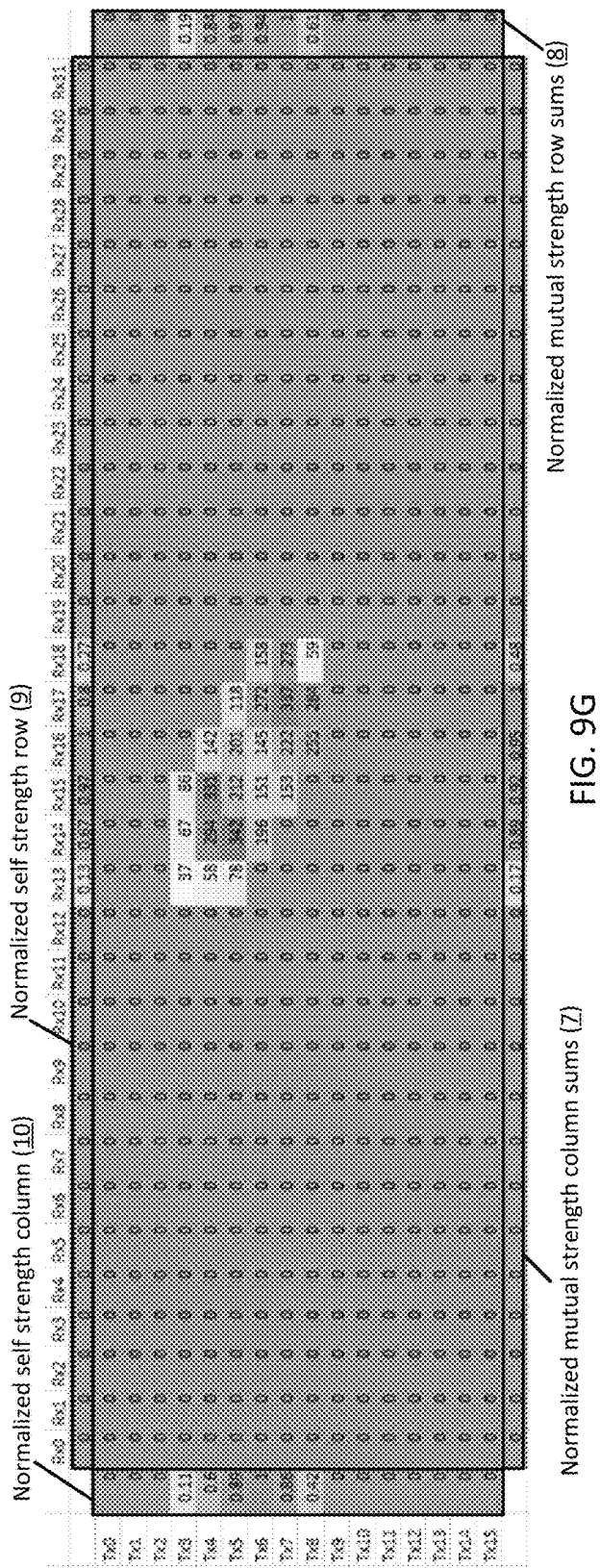
FIG. 9G is a chart showing the normalization of the self capacitance touch data and the mutual capacitance touch data row and column sums of FIG. 9F.
Figure 9H:
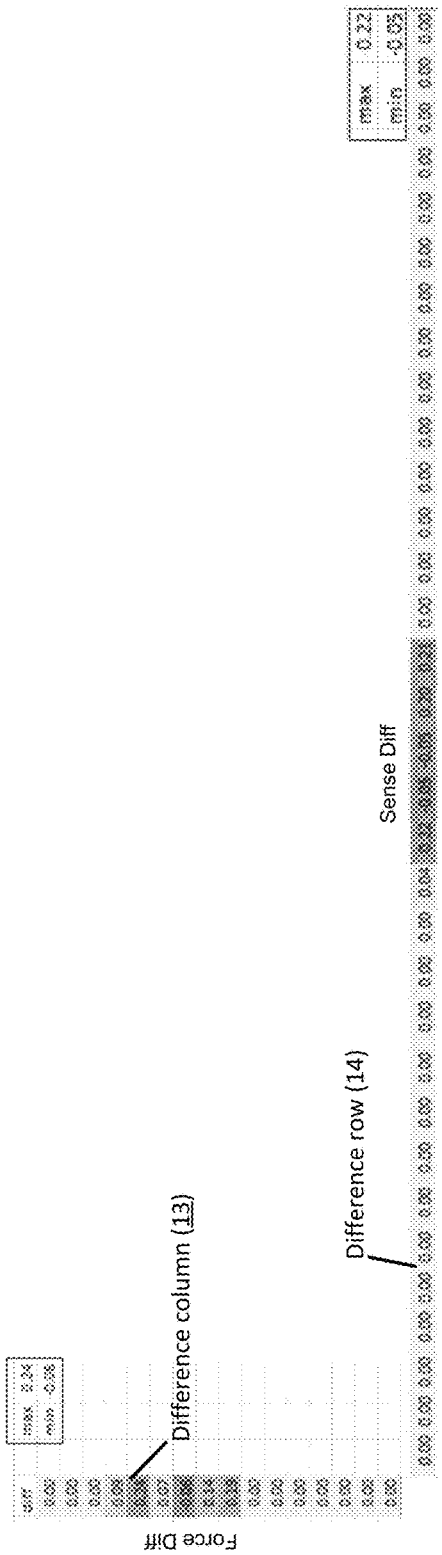
FIG. 9H is a chart showing the calculation of differences between the normalized self capacitance touch data and the normalized mutual capacitance touch data row and column sums of FIG. 9G.

Then, at Block 211, the normalized mutual sense column sums 7 of FIG. 9G are subtracted from the self strength row values 9 of FIG. 9G to produce a difference row 14 as shown in FIG. 9H. Likewise, the normalized mutual sense row sums 8 of FIG. 9G are subtracted from the self strength column values 10 of FIG. 9G to produce a difference column 13 as shown in FIG. 9H.

A largest positive difference value is located and saved (value2) at Block 212, and a smallest negative difference value is located and saved (value3) at Block 213. In the example of FIG. 9H, it can be seen that the value2 will be 0.24, and the value3 will be −0.06.

Now, at Block 214, entry conditions to the floating mode are evaluated. If the largest positive difference value (value2) is greater than a positive threshold, and if the smallest negative difference value (value3) is less than a negative threshold, and if an absolute value of the negative sum (value1) is greater than a sum mutual negative threshold, then floating mode is entered at Block 215. Otherwise, normal mode is entered at Block 216.

Here, the positive threshold is set at 0.18 and the negative threshold is set at −0.05. Since 0.24 (value2) is greater than 0.18 (positive threshold), since −0.06 is less than −0.05, and since |−870| is greater than 30 (sum mutual negative threshold), floating mode is in fact entered in the example of 9A-9H.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A touch screen controller operable with a touch screen, the touch screen controller, comprising:
   an input circuitry configured to operate the touch screen; and
   a processing circuitry configured to cooperate with the input circuitry to:
   acquire mutual touch data from the touch screen;
   sum values of the mutual touch data to produce mutual sums;
   acquire self touch data from the touch screen;
   normalize the mutual sums and the self touch data;
   calculate differences between the normalized self touch data and the normalized mutual sums; and
   enter into a floating mode of touch data processing when a largest difference that is positive is greater than a positive difference threshold and when a smallest difference value that is negative is less than a negative difference threshold, and alternatively enter a non-floating mode of touch data processing when the largest difference that is positive is less than the positive difference threshold or when the smallest difference value that is negative is less than the negative difference threshold.

2. The touch screen controller of claim 1, wherein the processing circuitry does not enter into the floating mode of touch data processing when a determined touch movement speed is less than a touch movement threshold.

3. The touch screen controller of claim 1, wherein the processing circuitry is configured to discard values of the self touch data that are less than a first threshold, prior to normalization.

4. The touch screen controller of claim 3, wherein the processing circuitry is configured to discard values of the mutual touch data that are outside of an area defined by the self touch data remaining after discarding of the values less than the first threshold, and to discard remaining values of the mutual touch data that are less than a second threshold, prior to summing.

5. The touch screen controller of claim 4, wherein the processing circuitry is configured to sum values of the mutual touch data that are negative, prior to discarding the remaining values of the mutual touch data that are less than the second threshold; and wherein the processing circuitry is configured to enter into the floating mode of touch data processing when the largest difference that is positive is greater than the positive difference threshold and when the smallest difference value that is negative is less than the negative difference threshold and when an absolute value of the summed values of the mutual touch data that are negative is greater than a third threshold, and alternatively enter a non-floating mode of touch data processing when the largest difference that is positive is less than the positive difference threshold or when the smallest difference value that is negative is less than the negative difference threshold or when the absolute value of the summed values of the mutual touch data that are negative is less than the third threshold.

6. A touch screen controller operable with a touch screen, the touch screen controller, comprising:
   an input circuitry configured to operate the touch screen; and
   a processing circuitry configured to cooperate with the input circuitry to:
   acquire mutual touch data from the touch screen;
   sum values of the mutual touch data to produce mutual sums;
   acquire self touch data from the touch screen;
   normalize the mutual sums and the self touch data;
   calculate differences between the normalized self touch data and the normalized mutual sums; and
   enter into a floating mode of touch data processing when a largest difference is greater than a difference threshold, and alternatively enter a non-floating mode of touch data processing when the largest difference is less than the difference threshold.

7. The touch screen controller of claim 6, wherein the processing circuitry does not enter into the floating mode of touch data processing when a determined touch movement speed is less than a touch movement threshold.

8. The touch screen controller of claim 6, wherein the processing circuitry is configured to discard values of the self touch data that are less than a first threshold, prior to normalization.

9. The touch screen controller of claim 8, wherein the processing circuitry is configured to discard values of the mutual touch data that are outside of an area defined by the self touch data not discarded, and to discard remaining values of the mutual touch data that are less than a second threshold, prior to summing.

10. A method, comprising:
   determining whether a ground of a touch screen device and a ground of an object touching a touch screen of the touch screen device are mismatched by:
   acquiring mutual touch data and self touch data from the touch screen, the mutual touch data being arranged into multiple rows and multiple columns, the self touch data being arranged into a single row and a single column;

discarding self touch data values that are less than a first threshold;

discarding mutual touch data values that are outside of an area defined by those self touch data values that are greater than the first threshold;

discarding mutual touch data values that are less than a second threshold;

summing remaining mutual touch data values in each column to produce mutual touch column sums;

summing remaining mutual touch data values in each row to produce mutual touch row sums;

normalizing remaining self touch data values, the mutual touch column sums, and the mutual touch row sums;

calculating differences between the single row of normalized self touch data and the normalized mutual touch column sums;

calculating differences between the single column of normalized self touch data and the normalized mutual touch row sums;

determining a mismatch when a largest difference is greater than a positive threshold and when a smallest mutual difference is less than a negative threshold; and determining a lack of mismatch when the largest difference is less than the positive threshold or when the smallest mutual difference is greater than the negative threshold;

based on determination of mismatch, switching touch sensing of the touch screen device into floating mode; and based on determination of a lack of mismatch, switching touch sensing of the touch screen device into normal mode.

11. The method of claim 10, wherein the lack of mismatch is also determined when a determined touch movement speed is less than a touch movement threshold.

12. The method of claim 10, further comprising summing negative mutual touch data values remaining after discarding of mutual touch data values that are outside of the area defined by those self touch data values that are greater than the first threshold, but prior to discarding of mutual touch data values that are less than the second threshold.

13. The method of claim 12, wherein a mismatch is determined when a largest difference is greater than a positive threshold and when a smallest mutual difference is less than a negative threshold and when an absolute value of the summed negative mutual touch data values is greater than a third threshold; and wherein a lack of mismatch is determined when the largest difference is less than the positive threshold or when the smallest mutual difference is greater than the negative threshold or when the absolute value of the summed negative mutual touch data values is less than the third threshold.

* * * * *